United States Patent

Spangler

[15] 3,693,162

[45] Sept. 19, 1972

[54] SUBROUTINE CALL AND RETURN MEANS FOR AN ELECTRONIC CALCULATOR

[72] Inventor: Richard M. Spangler, Loveland, Colo.

[73] Assignee: Hewlett-Packard Company, Palo Alto, Calif.

[22] Filed: Oct. 14, 1970

[21] Appl. No.: 80,532

[52] U.S. Cl. .......... 340/172.5

[51] Int. Cl. .......... G06f 3/00

[58] Field of Search .......... 340/172.5, 365

[56] References Cited

UNITED STATES PATENTS

| | | | |
|---|---|---|---|
| 3,487,369 | 12/1969 | King et al. | 340/172.5 |
| 3,158,317 | 11/1964 | Alexander | 340/172.5 X |
| 3,187,321 | 6/1965 | Kameny | 340/172.5 X |
| 3,238,505 | 3/1966 | Shapiro et al. | 340/172.5 |
| 3,380,031 | 4/1968 | Clayton et al. | 340/172.5 |
| 3,381,276 | 4/1968 | James | 340/172.5 |
| 3,495,222 | 2/1970 | Perotto et al. | 340/172.5 |
| 3,530,440 | 9/1970 | Osborne | 340/172.5 |
| 3,533,076 | 10/1970 | Perkins et al. | 340/172.5 |

*Primary Examiner*—Paul J. Henon
*Assistant Examiner*—Melvin B. Chapnick
*Attorney*—Roland I. Griffin

[57] ABSTRACT

Two electronic calculator keys provide unconditional GO TO and subroutine call/return and return functions. A GO TO instruction followed by an alpha-numerical address causes the calculator to unconditionally branch to the address indicated. The GO TO instruction followed by a SUB instruction and an alpha-numerical address causes the calculator to unconditionally branch to a subroutine at the address indicated, and the SUB instruction alone causes the calculator to unconditionally branch (return) to the address it was at when it branched to the subroutine.

1 Claim, 1 Drawing Figure

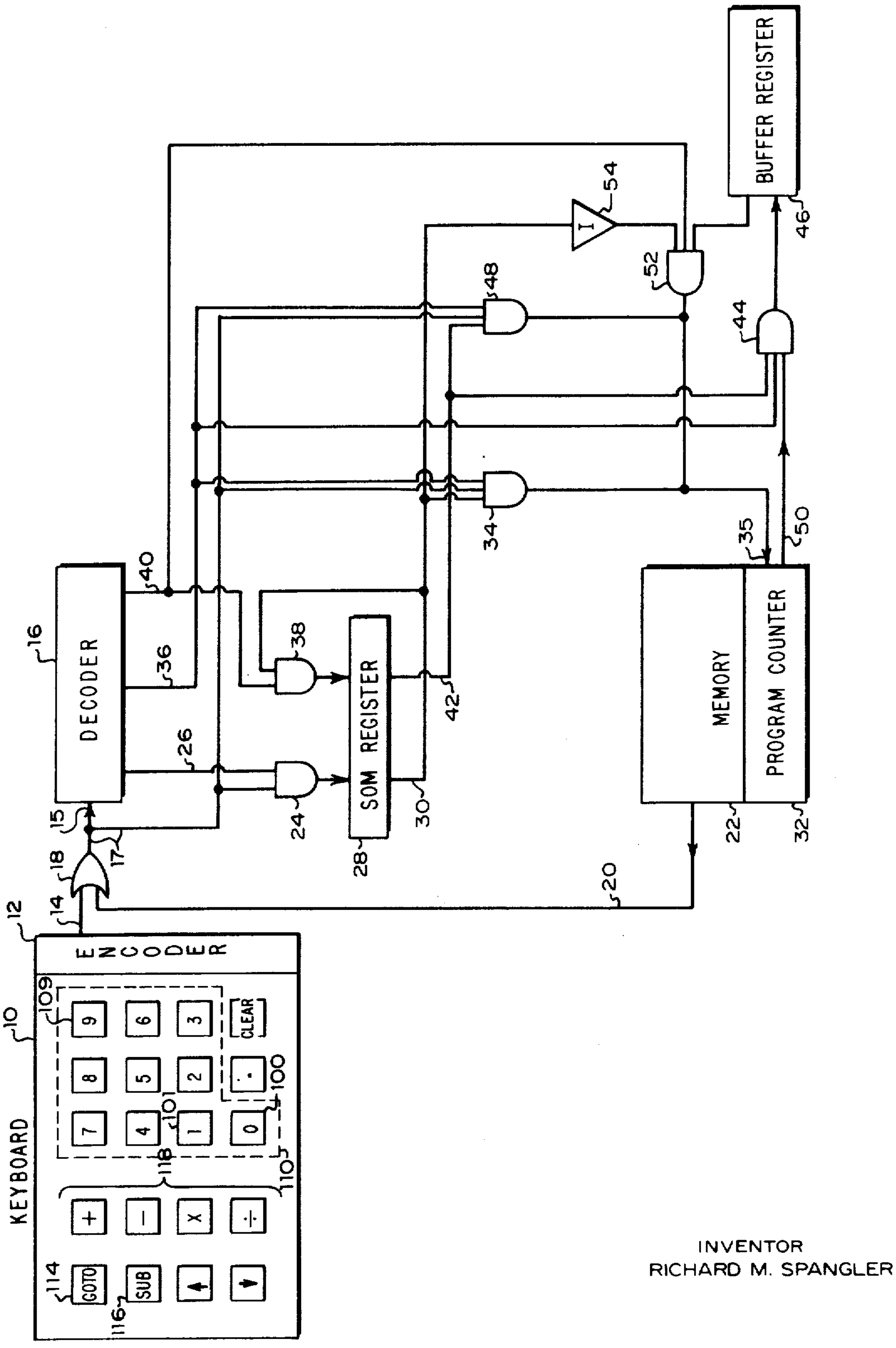
INVENTOR
RICHARD M. SPANGLER

SUBROUTINE CALL AND RETURN MEANS FOR AN ELECTRONIC CALCULATOR

BACKGROUND AND SUMMARY OF THE INVENTION

Programmable electronic calculators constructed according to the prior art and having subroutine and GO TO capabilities used three separate keys to initiate each of the GO TO, GO TO subroutine, and RETURN from subroutine functions. However, when a large number of operations or functions is included in an electronic calculator, it is necessary to effect economies in the number of keys and machine instructions necessary to initiate the functions.

The present invention provides one key which preconditions the calculator for either GO TO function, the function performed being determined by subsequent key strokes. An unconditional GO TO is initiated by depressing the GO TO key and alpha-numeric keys indicating the desired memory address. A GO TO subroutine is initiated by depressing the GO TO key, the SUB key and alpha-numeric keys indicating the desired memory address. When the calculator branches to the new address, the address it was at is stored in a buffer register. The calculator returns to this stored address when the SUB key alone is depressed. Typically the GO TO and SUB operations for subroutines are executed as part of a stored program which was entered into the calculator memory from the keyboard.

DESCRIPTION OF THE DRAWING

The drawing is a block diagram of the preferred embodiment.

DESCRIPTION OF THE PREFERRED EMBODIMENT

The drawing shows a keyboard 10 connected to an encoder 12 for generating coded signals for each key depressed. The encoder may be any one of several types, well known in the art, such as a diode matrix (see, e.g., BURROUGHS CORPORATION, DIGITAL COMPUTER PRINCIPLES 323–28 (1962)) or an OR gate network (see, e.g., FLORES, COMPUTER LOGIC 193–94 (1960)). Such an encoder assigns a unique binary code to each key on keyboard 10. For example, five binary bits may comprise a key code. Output 14 of encoder 12 is connected to input 15 of a decoder 16 via an OR gate 18 and a line 17. All data lines are shown as single wires; however, in practice they may be a plurality of parallel wires to carry a plurality of data bits, five wires in the case of a five bit key code. Decoder 16 may comprise any one of several types well known to those skilled in the art such as a diode matrix (see, e.g., BURROUGHS CORPORATION, supra) or an AND gate network (see, e.g., FLORES, supra at 194–95). In the case of a a five bit key code as described above, the decoder may be provided with two outputs, 26 and 40, connected to line 15. If line 15 contains the key code assigned to GO TO key 114 there will be an output on line 26. If line 15 contains the key code assigned to SUB key 116 an output will appear on line 40. Other outputs may, of course, be provided to give output signals in response to the depression of various other keys, such as line 36 for alpha numeric keys 110. A memory 22 is also connected to input 15 of decoder 16 via a line 20 and OR gate 18. The memory may be any of a number of well known types such as a magnetic core memory (see, e.g., FLORES, supra at 242–51). A series of calculator instructions may be stored in memory 22 to form a program, and during calculator operation decoder 16 may receive instructions from keyboard 10 or memory 22 through OR gate 18. For simplicity, only a few examples of functional keys 118 are shown.

If decoder 16 receives a GO TO instruction, either from key 114 or memory 22, decoder 16 will signal AND gate 24 via line 26 to enter a code representing the GO TO instruction in an intermediate or state of machine (SOM) register 28. In response to this code SOM register 28 will place a signal on line 30. A program counter 32 connected to memory 22 controls the current address of memory 22 and determines the sequence in which the memory addresses are selected. Such a program counter might be constructed as shown and described in FLORES, supra section 11.9 and figure 11.9.1. If the GO TO instruction is followed by an alpha-numerical character, either from keys 110 or memory 22, a new address indicated by the alpha-numeric character will be entered into program counter 32 via an AND gate 34 connected to program counter input 35. AND gate 34 is activated for this purpose by the signal placed on line 30 in response to entry of the GO TO instruction code in SOM register 28, by the alpha-numeric character code placed on line 17 in response to keyboard 10 or memory 22, and by a signal placed on a decoder output line 36 in response to an alpha-numeric character code applied to input 15 of decoder 16.

If the GO TO instruction supplied to decoder 16 is followed by a SUB instruction, either from key 116 or memory 22, an AND gate 38, connected to SOM register 28, will receive signals from decoder output line 40 and from line 30. These signals activate AND gate 38 to enter a new code representing a GO TO SUB instruction into SOM register 28. In response to this new code, SOM register 28 will place a signal on line 42 and remove the signal from line 30. If the next signal to decoder 16 is an alpha-numeric character a two part operation will take place. An AND gate 44, connected to buffer register 46, will transfer the current address out of program counter 32 into buffer register 46, and an AND gate 48, connected to program counter input 35, will transfer the new address, indicated by the alpha-numeric character code, into program counter 32. AND gate 44 is activated for this purpose by the signal placed on line 36 in response to the alpha-numeric character code applied to input 15 of decoder 16, by the signal placed on line 42 in response to entry of the GO TO SUB instruction code in SOM register 28, and by the current address signal on program counter output line 50. AND gate 48 is similarly activated for this purpose by the aforementioned signals placed on lines 36 and 42 in combination with the alpha-numeric character code placed on line 17 in response to keyboard 10 or memory 22.

When decoder 16 receives a SUB instruction and there has been no immediately previous GO TO instruction, an AND gate 52, connected to program counter input 35, will transfer the address stored in buffer register 46 back into program counter 32. AND gate 52 is activated for this purpose by a signal provided on line 30 during the absence of the GO TO instruction code in SOM register 28 and inverted by an inverter 54 connected between SOM register 28 and AND gate 52, by the signal placed on decoder output line 40 in response to the SUB instruction applied to input 15 of decoder 16, and by the stored address signal in buffer register 46.

I claim:

1. An electronic calculator comprising:

a keyboard having a plurality of keys including alpha numeric, functional and instructional keys, and having encoding means for generating a key code signal for each key in response to a key being depressed, the key codes being available at a keyboard output;

a buffer storage register;

a memory having a plurality of addressable locations having key codes stored at selected ones of the locations;

a program counter connected to the memory for selecting memory locations in a predetermined sequence, the contents of said selected memory locations being available at a memory output;

an intermediate storage register;

decoding means connected to the encoding means and the memory for decoding the key code signals;

first logic means connected to the keyboard, memory, decoding means and intermediate storage register for storing a first instructional key code signal from the keyboard or memory output, the first signal being available at a first output, and for storing a second signal in the intermediate storage register in response to the presence of said first signal at the first output and a second instructional key code from the keyboard or memory output, the second signal being available at a second output;

second logic means connected to the intermediate storage register, keyboard, memory, decoding means, buffer storage register and program counter for setting the program counter to a new memory location in response to the presence of the second signal at the second output of the first logic means and an alpha numeric key code at the keyboard or memory output, this key code indicating the new memory location, and for storing in the buffer storage register the memory location selected by the program counter immediately preceding the new memory location to which the program counter is set by the second logic means; and third logic means connected to the program counter, buffer storage register, intermediate storage register and decoding means for setting the program counter to the memory location stored in the buffer storage register in response to the absence of the first signal at the first output of the first logic means and a signal from the decoding means in response to the second instructional key code.

* * * * *